(12) United States Patent
Ulrich (10) Patent No.: US 9,089,096 B1
(45) Date of Patent: Jul. 28, 2015

(54) PRE-FORMED LANDSCAPE BARRIER (71) Applicant: Michael R. Ulrich, Lockport, NY (US)

(72) Inventor: Michael R. Ulrich, Lockport, NY (US)

( * ) Notice: Subject to any disclaimer, the term of this patent is extended or adjusted under 35 U.S.C. 154(b) by 0 days.

(21) Appl. No.: 14/150,220

(22) Filed: Jan. 8, 2014

Related U.S. Application Data (60) Provisional application No. 61/888,773, filed on Oct. 9, 2013.

(51) Int. Cl.
*A01G 1/08* (2006.01)
*E04B 2/08* (2006.01)
*E04B 2/18* (2006.01)

(52) U.S. Cl.
CPC ... *A01G 1/08* (2013.01); *E04B 2/08* (2013.01); *E04B 2/18* (2013.01)

(58) Field of Classification Search
CPC ............... A01G 1/08; E04B 2/08; E04B 2/18
USPC ............................................ 52/102, 603, 604
See application file for complete search history.

(56) References Cited

U.S. PATENT DOCUMENTS

| 207,155 | A | * | 8/1878 | Bassett | 52/102 |
| 1,689,107 | A | * | 10/1928 | Bradley | 52/592.3 |
| 2,241,169 | A | * | 5/1941 | Yokes | 52/223.7 |
| 2,461,535 | A | * | 2/1949 | Erhardt | 446/104 |
| 2,472,221 | A | * | 6/1949 | Malthouse | 52/745.1 |
| 2,483,560 | A | * | 10/1949 | Peterson | 52/99 |
| 2,550,945 | A | | 5/1951 | Steinhage et al. | |
| 2,668,435 | A | * | 2/1954 | Clements | 52/592.3 |
| 2,844,022 | A | * | 7/1958 | Klem | 52/592.5 |
| 3,180,059 | A | * | 4/1965 | Persak, Jr. | 52/592.6 |
| 3,305,982 | A | * | 2/1967 | Steele | 52/90.1 |
| 3,618,279 | A | * | 11/1971 | Sease | 52/223.7 |
| D229,210 | S | | 11/1973 | Tabone | |
| 4,267,662 | A | * | 5/1981 | Gordy | 446/89 |
| 4,297,816 | A | * | 11/1981 | Kella et al. | 52/125.3 |
| 4,429,506 | A | * | 2/1984 | Henderson | 52/591.1 |
| 4,436,447 | A | * | 3/1984 | Crowe | 405/16 |
| 4,516,364 | A | * | 5/1985 | Heider | 52/98 |
| 4,647,491 | A | | 3/1987 | Ireland et al. | |
| 4,965,979 | A | * | 10/1990 | Larrivee et al. | 52/592.6 |
| 5,230,195 | A | * | 7/1993 | Sease | 52/592.6 |
| 5,240,343 | A | * | 8/1993 | Strobl, Jr. | 404/7 |
| 5,317,833 | A | * | 6/1994 | Goldman | 47/33 |
| 5,365,714 | A | * | 11/1994 | Potvin | 52/590.2 |
| 5,375,941 | A | * | 12/1994 | Strobl, Jr. | 404/7 |
| 5,402,609 | A | * | 4/1995 | Kelley, Jr. | 52/98 |
| 5,493,816 | A | * | 2/1996 | Willemsen | 52/2.11 |
| 5,568,994 | A | | 10/1996 | Dawson | |
| 5,615,529 | A | * | 4/1997 | Johnson et al. | 52/604 |
| 5,651,642 | A | * | 7/1997 | Kelley et al. | 405/286 |
| 5,666,778 | A | * | 9/1997 | Grattan et al. | 52/606 |
| 5,688,079 | A | * | 11/1997 | Bolduc et al. | 405/286 |
| 5,771,650 | A | * | 6/1998 | Williams et al. | 52/568 |
| 5,816,738 | A | * | 10/1998 | Harnapp | 404/18 |
| 5,832,687 | A | * | 11/1998 | Willemsen | 52/592.6 |

(Continued)

*Primary Examiner* — Rodney Mintz
(74) *Attorney, Agent, or Firm* — Robert C. Montgomery; Montgomery Patent & Design, LLC (57) ABSTRACT

A landscape barrier comprised of pre-formed elements having interlocking features is presented. The pre-formed elements lock onto a carrier plate which can be pinned to the ground using anchors. The interlocking features are post and socket that snap fit together to secure the elements to each other. The carrier plate may protrude outwardly to form a border, thereby reducing grass and weed trimming around the barrier.

12 Claims, 6 Drawing Sheets

(56) References Cited

U.S. PATENT DOCUMENTS

| | | | |
|---|---|---|---|
| D409,457 S | 5/1999 | Tisbo et al. | |
| 5,934,037 A * | 8/1999 | Bundra | 52/603 |
| 6,050,873 A * | 4/2000 | Reisman | 446/128 |
| D426,322 S | 6/2000 | Anderson et al. | |
| 6,088,987 A * | 7/2000 | Simmons et al. | 52/592.6 |
| D433,072 S | 10/2000 | Frank | |
| 6,161,357 A * | 12/2000 | Altemus | 52/592.6 |
| 6,162,108 A * | 12/2000 | Frederiksen | 446/102 |
| 6,233,897 B1 * | 5/2001 | Jurik | 52/604 |
| D467,357 S | 12/2002 | O'Brien | |
| 6,571,525 B2 * | 6/2003 | Coleman | 52/592.5 |
| D479,000 S * | 8/2003 | van Oort | D25/113 |
| 7,195,421 B2 * | 3/2007 | Dunbar | 404/8 |
| D581,549 S * | 11/2008 | Thorkelson | D25/113 |
| 7,461,490 B2 * | 12/2008 | Toledo | 52/605 |
| 7,610,730 B2 * | 11/2009 | O'Connor | 52/442 |
| D605,313 S | 12/2009 | Wilson et al. | |
| D612,069 S * | 3/2010 | Usul et al. | D25/113 |
| D612,070 S * | 3/2010 | Usul et al. | D25/113 |
| D647,632 S | 10/2011 | MacDonald | |
| D666,318 S | 8/2012 | MacDonald | |
| 8,266,862 B2 * | 9/2012 | Huang | 52/585.1 |
| 8,297,012 B2 * | 10/2012 | Nunez-Vargas | 52/223.7 |
| 8,382,398 B2 * | 2/2013 | Stauffacher et al. | 405/111 |
| 8,721,219 B2 * | 5/2014 | Hill | 405/25 |
| 9,010,059 B2 * | 4/2015 | Lin | 52/585.1 |
| 2001/0019684 A1 * | 9/2001 | Manthei et al. | 405/284 |
| 2003/0029119 A1 * | 2/2003 | Coleman | 52/604 |
| 2004/0154256 A1 * | 8/2004 | Kim | 52/592.6 |
| 2006/0059824 A1 * | 3/2006 | Barbisch | 52/503 |
| 2006/0207206 A1 * | 9/2006 | Everett et al. | 52/604 |
| 2007/0154265 A1 * | 7/2007 | Stauffacher et al. | 405/110 |
| 2008/0202054 A1 * | 8/2008 | Abella | 52/568 |
| 2009/0094917 A1 * | 4/2009 | McIntosh | 52/311.1 |
| 2009/0113836 A1 * | 5/2009 | Pitchers et al. | 52/604 |
| 2011/0225909 A1 * | 9/2011 | Rodriguez Carassus | 52/261 |
| 2011/0265418 A1 * | 11/2011 | Wolter et al. | 52/561 |
| 2013/0031852 A1 * | 2/2013 | Hill | 52/144 |
| 2013/0312357 A1 * | 11/2013 | Lin | 52/589.1 |
| 2015/0075106 A1 * | 3/2015 | Vandenbempt | 52/596 |
| 2015/0082733 A1 * | 3/2015 | Phillips | 52/604 |

* cited by examiner

PRE-FORMED LANDSCAPE BARRIER

RELATED APPLICATIONS

The present invention was first described in and claims the benefit of U.S. Provisional Application No. 61/888,773, filed Oct. 9, 2013, the entire disclosures of which are incorporated herein by reference.

FIELD OF THE INVENTION

The presently disclosed subject matter is directed to landscaping. More particularly, the present invention relates to landscape barriers.

BACKGROUND OF THE INVENTION

Millions of Americans spend countless hours maintaining and beautifying their lawns and landscape. They manicure their grass, plant and maintain flowers, shrubs, bushes, and trees, install ponds and gardens all for the sake of enhancing the aesthetics of their property. For many maintaining a beautiful home having a beautiful yard offset by beautiful landscaping are matters of personal pride and personal expression as well as a way to increase the value of their property.

One (1) very popular item that has found favor in recent times is plastic lawn edging. Plastic lawn edging, which is usually black, is placed around sidewalks, paths, flowerbeds, and other areas where grass is not desired. It provides a neat and clean look for any environment while retarding grass expansion. However, plastic lawn edging is usually very thin and does not always present the most desired visual accent. While wider materials such as wood, concrete or the like can be and have been used to provide more pleasing appearances such materials are often expensive, heavy, and time consuming to work with.

Accordingly, there exists a need for aesthetically pleasing, eye-catching wide landscape barriers suitable for use around walkways, flower beds, trees, sidewalks, paths driveways and the like. Such wide landscape barriers should be easy to work with, provide simplicity of handling, all while avoiding the difficulties of installation common with concrete and wood. Such landscape barriers ideally should be comprised of individually molded sections that interlock to form a desired pattern. Ideally, such landscape barriers would reduce the need for lawn trimming while providing highly flexible barriers, including tiered barriers. Preferably such wider barriers could be made available in multiple colors and styles and would include both straight and curved sections. Ideally, such wide landscape barriers would be suitable for burial in soil, mulch, or other landscaping materials. Ideally, such wide landscape barriers would not rot and would be insect resistant and suitable for residential, commercial, institutional, and industrial properties.

SUMMARY OF THE INVENTION

The principles of the present invention provide for wide landscape barriers that can be used around walkways, flower beds, trees, sidewalks, paths driveways and the like to provide aesthetically pleasing landscaping. The wide landscape barriers are easy to work with, are made from highly configurable, lightweight, insect resistant, interlocking sections that can be partially buried in soil, mulch, or other landscaping materials without rotting. The wide landscape barriers are suitable for use on residential, commercial, institutional, and industrial properties.

A landscape barrier that is in accord with the present invention include a carrier plate having an aperture and a first post, a curved wall element having a bottom with a socket configured to receive the first post and a top with a second post, a curved cap element having a bottom with a socket configured to receive the second post; and an anchor for passing through the aperture. The curved wall element and the curved cap element can be interconnected by locking the second post of the curved wall element into the socket of the curved cap element and the curved wall element and the carrier plate can be interconnected by locking the first post into the socket of the curved wall element.

The second curved wall element can have a bottom with a second socket that is configured to receive the second post and a top with a second post. The first posts and the second posts are beneficially similarly dimensioned and the first posts and the second posts are configured to both fit into a socket. In practice, the first post includes a male locking feature and the socket includes a female locking feature. Preferably, the first post snap-fits into the socket.

The carrier plate may be an arcuate-shaped planar structure suitable for burial. The second post and the socket of the curved cap element enable the curved cap element and the curved wall element to be horizontally offset when interconnected.

Another landscape barrier that is in accord with the present invention include an elongated carrier plate having an aperture and a first post, a straight wall member having a bottom with a socket that is configured to receive the first post and a top with a second post, a straight cap member having a bottom with a socket that is configured to receive the second post, and an anchor for passing through the aperture. The straight wall element and the straight cap member can be interconnected by locking the second post of the straight wall element into the socket of the straight cap member and the straight wall element and the carrier plate can be interconnected by locking the first post into the socket of the straight wall element.

The corner member may have a bottom with a socket that is configured to receive the first post and a top with a second post. The landscape barrier may also include a second straight wall element having a bottom with a second socket that is configured to receive the second post and a top with a second post. In practice the first posts and the second posts are similarly dimensioned while the first posts and the second posts are configured to fit into a socket. Beneficially, the first post includes a male locking feature while the socket includes a female locking feature. Ideally, the first post snap-fits into the socket. The second post and the socket of the straight cap member are preferably located such that the straight cap member and the straight wall element can be horizontally offset when interconnected. Preferably the carrier plate is comprised of a material suitable for burial.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 5a is a perspective view of a straight assembly embodiment 200 of the present invention; and, FIG. 5b is a partially exploded view of the straight assembly embodiment 200 shown in FIG. 5a.

DESCRIPTIVE KEY 10 preformed landscape barrier
20 curved wall element
22 curved cap element
25 first post
26 second post
28 socket
30 male locking feature
32 female locking feature
40 curved carrier plate
43 anchor aperture
100 tree
110 ground
120 anchor
200 straight assembly embodiment
220 straight wall element
222 straight cap element
224a left corner element
224b right corner element
240 straight carrier plate

DETAILED DESCRIPTION OF THE PREFERRED EMBODIMENT

Figure 3:
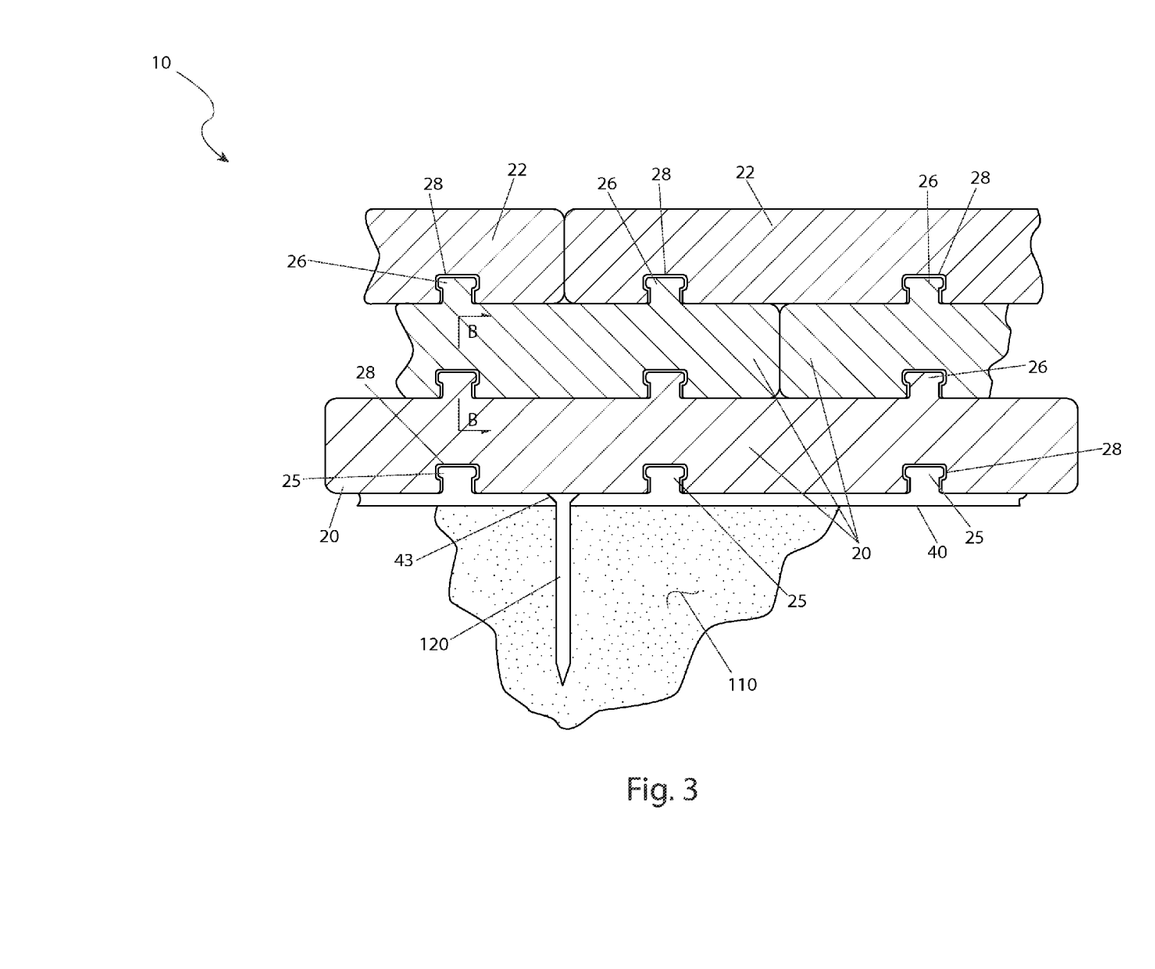
FIG. 3 is a sectional view of the preformed landscape barrier 10 taken along section line A-A of FIG. 1.
Figure 4:
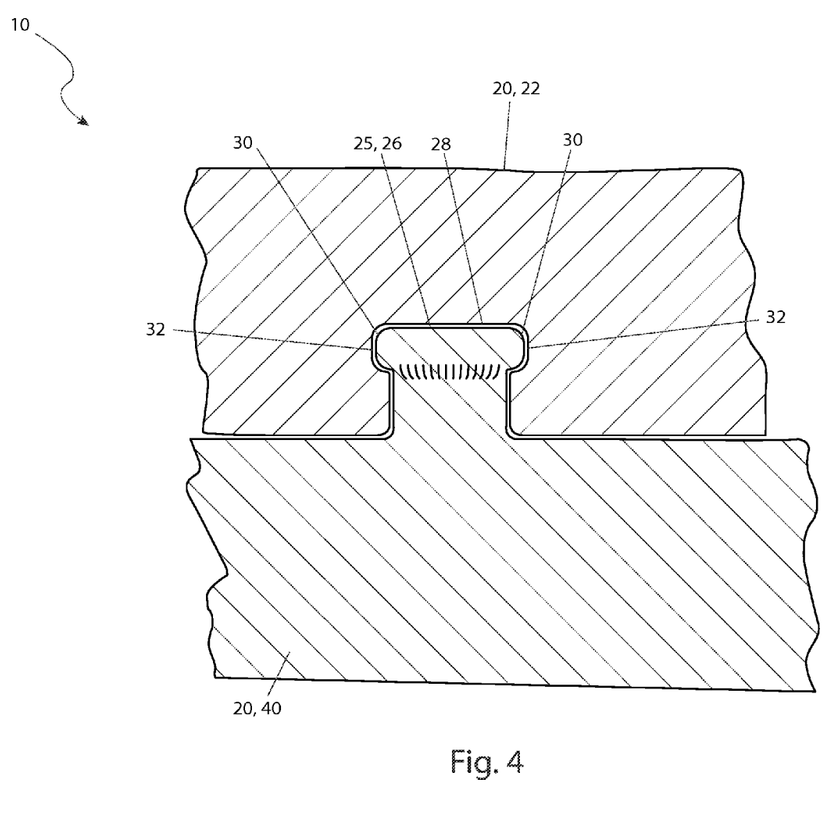
FIG. 4 is a sectional view of a representative post 25, 26 and socket 28 of the preformed landscape barrier 10 taken along section line B-B of FIG. 3.
Figure 5A:
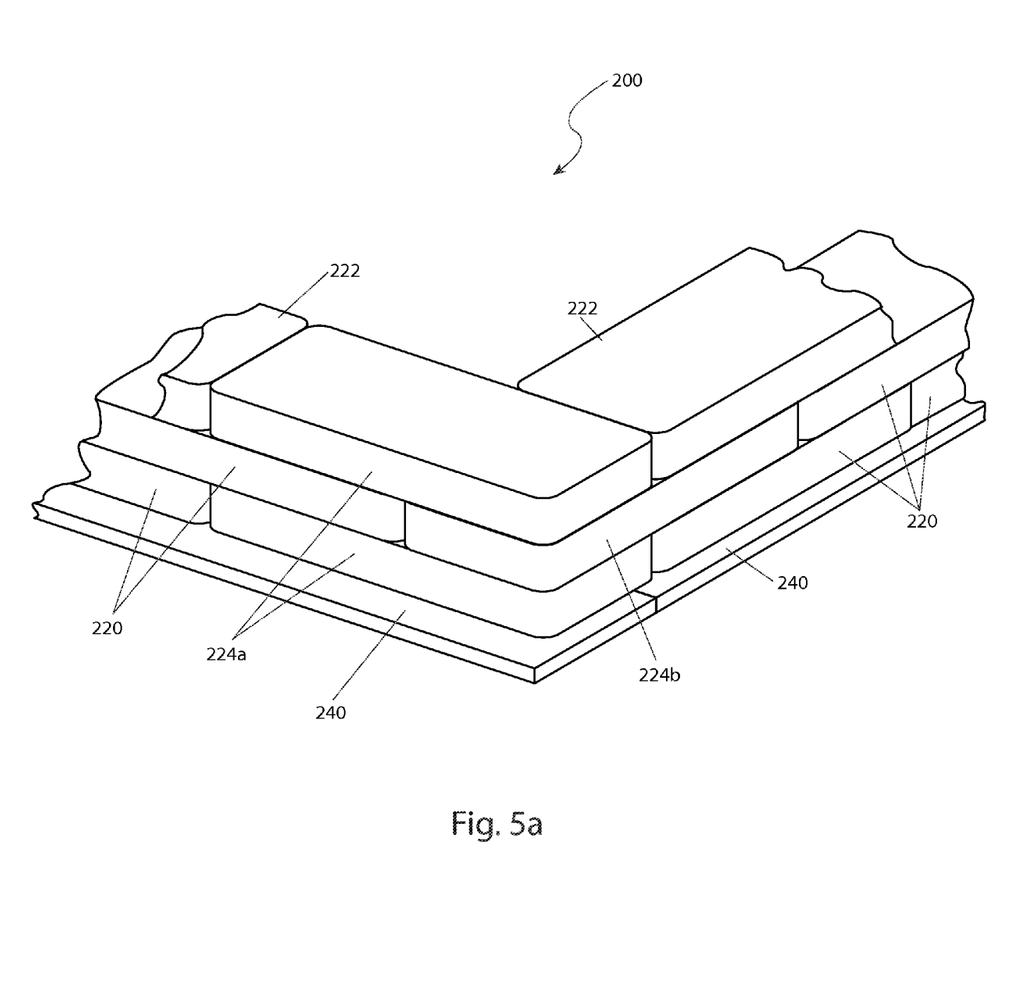
Figure 5B:
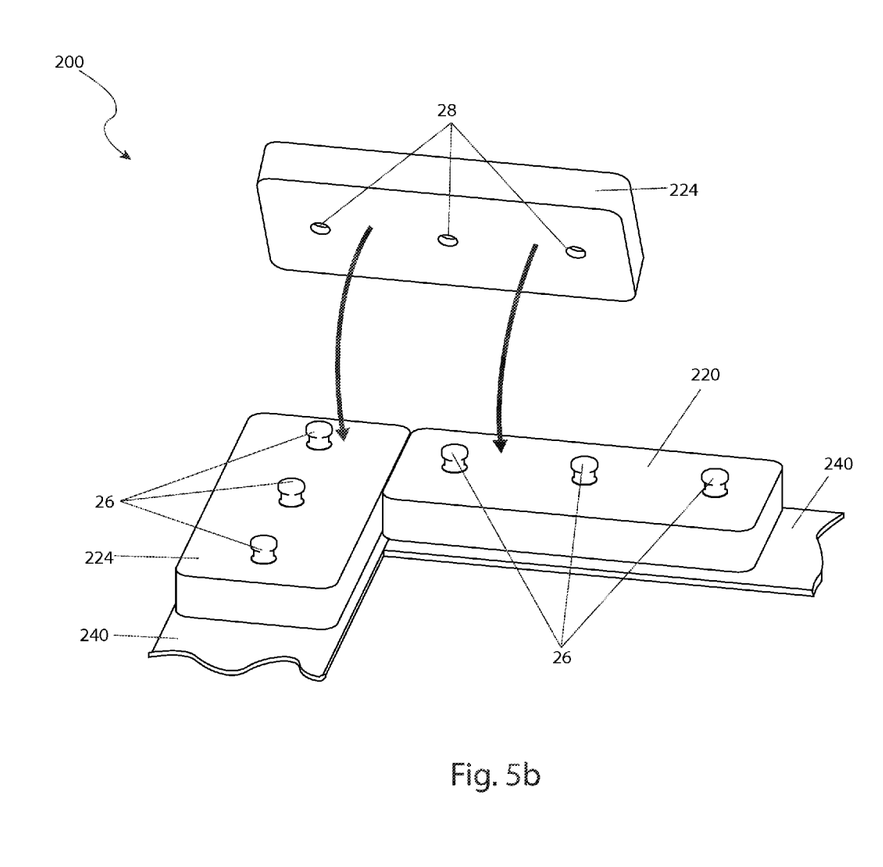

The best mode for carrying out the invention is presented in terms of its preferred embodiment, depicted in FIGS. 1 through 4 and in terms of an alternate straight embodiment depicted in FIGS. 5a and 5b. However, the invention is not limited to the specifically described embodiment. A person skilled in the art will appreciate that many other embodiments of the invention are possible without deviating from the basic concept of the invention. Any such work around will also fall under scope of this invention. While only one particular configuration is shown and described that is for purposes of clarity and disclosure and not by way of limitation of scope.

In the figures like numbers refer to like elements throughout. Additionally, the terms "a" and "an" as used herein do not denote a limitation of quantity, but rather denote the presence of at least one (1) of the referenced items. Finally, any directional signal such as top, bottom, left, right, upper and lower are take with reference to the orientation shown in FIGS. 1 and 5a.

The preferred embodiment of the present invention is a curved preformed landscape barrier 10, while an alternative embodiment is a straight assembly embodiment 200 landscape barrier. The landscape barrier 10 includes a carrier plate 40 which supports generally flat interconnecting curved elements which are described in more detail subsequently, while the straight assembly embodiment 200 has straight elements. The landscape barrier 10 and the straight assembly embodiment 200 can be freely arranged to form a decorative retaining barrier around trees 100, flower beds, driveways, walkways, and other similar locations.

Figure 1:
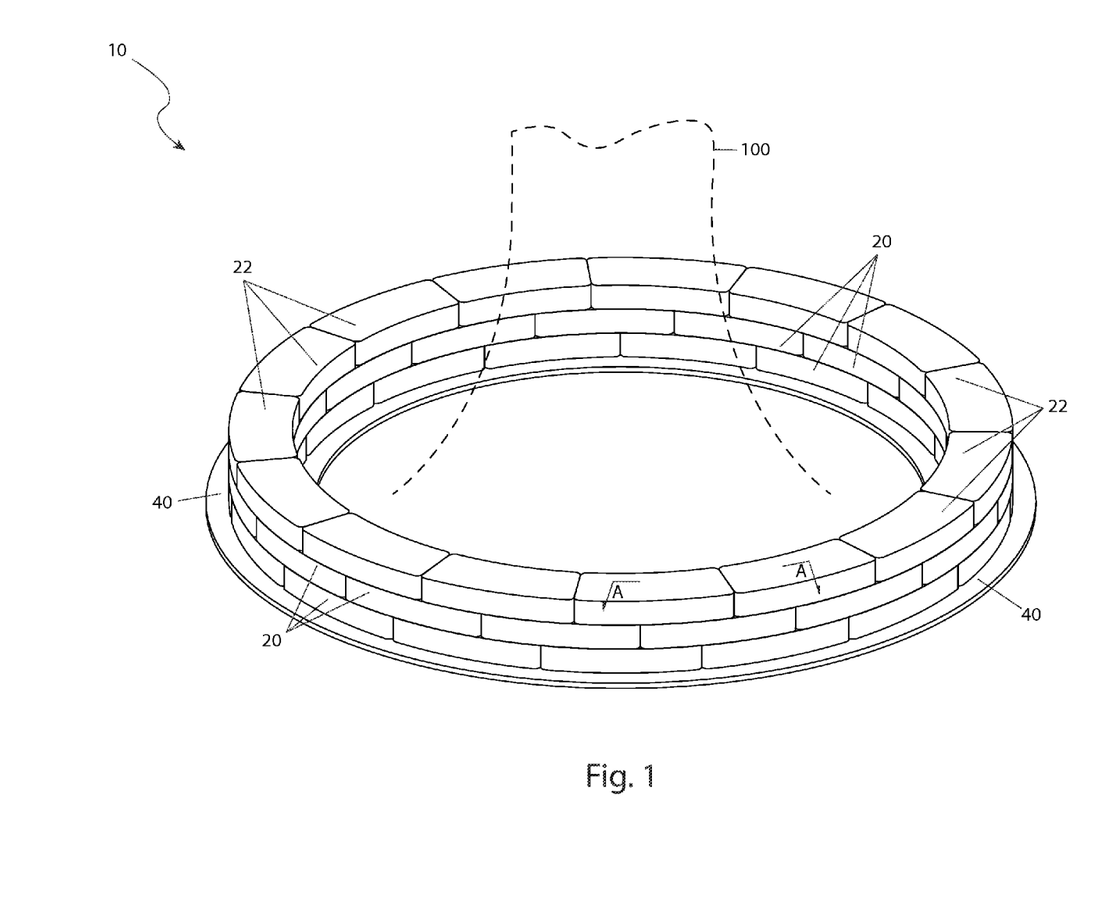
FIG. 1 is a front perspective view of a preformed landscape barrier 10 forming an exemplary assembly.
Figure 2:
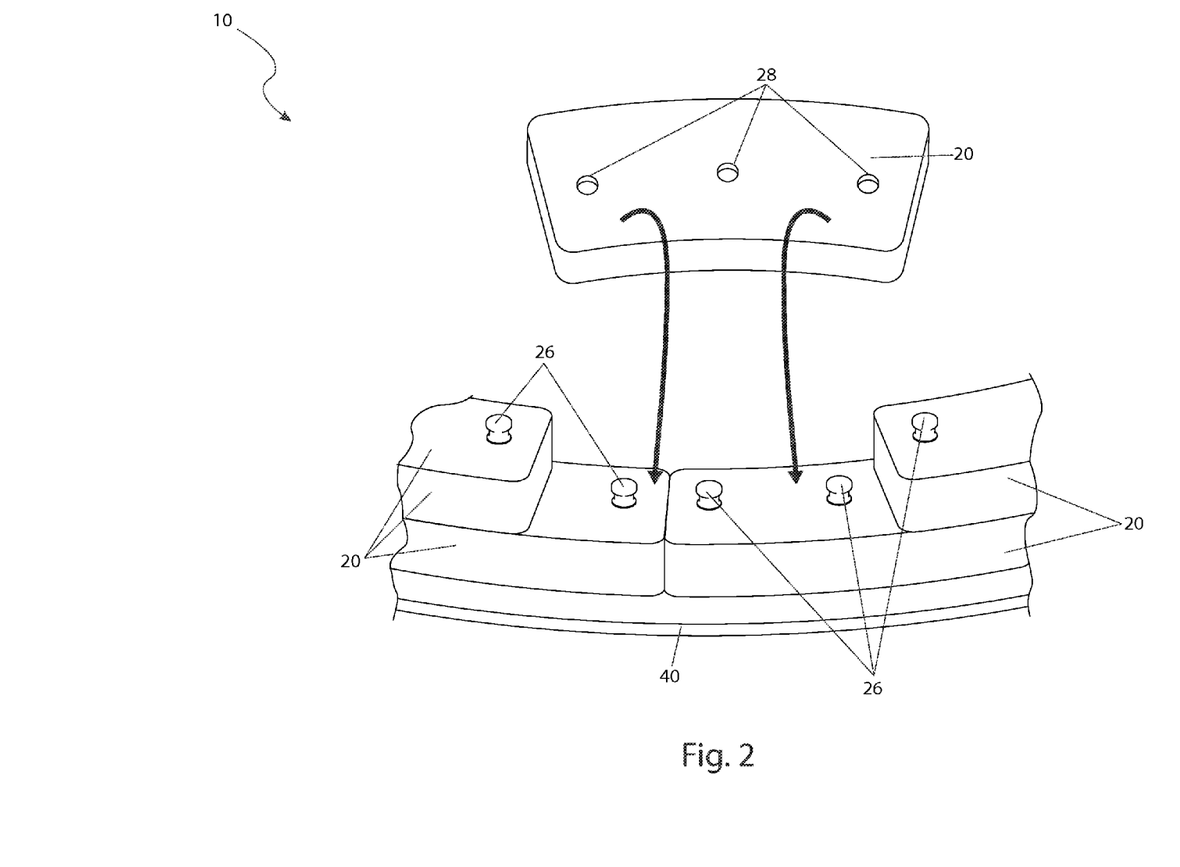
FIG. 2 is a partially exploded close-up view of the preformed landscape barrier 10 shown in FIG. 1.

Refer now to FIGS. 1 and 2, respectively front perspective and sectional views of the landscape barrier 10. The landscape barrier 10 is shown providing an assembly of interlocking members having matching radii. The landscape barrier 10 includes a plurality of curved wall elements 20, a plurality of curved cap elements 22, and a carrier plate 40.

The curved wall elements 20 and curved cap elements 22 are envisioned as being made of molded high-density polystyrene, molded or extruded plastic or equivalent light-weight material. The tiers of curved wall elements 20 are preferably arranged horizontally offset to overlap subjacent and superjacent tiers. Each curved wall element 20 and each curved cap element 22 is envisioned as being approximately twelve to fourteen inches (12-14 in.) long, two inches (2 in.)thick, and six inches (6 in.) wide. However, the dimensions of the elements 20, 22 may vary based upon particular applications of the landscape barrier 10.

The carrier plate 40 is a rigid or semi-rigid flat arcuate-shaped panel lying along a horizontal plane and being about one-quarter inch (¼ in.) thick. The carrier plate 40 is preferably made from a water-resistant material such as a coated metal, plastic, or wood. The carrier plate 40 is positioned beneath the curved wall elements 20 and curved cap elements 22 on a ground 110. The carrier plate 40 supports and stabilizes the curved wall elements 20 and curved cap elements 22 and has a perimeter that extends beyond those elements, creating a decorative border. The carrier plate 40 eliminates the need for grass and weed trimming around the landscape barrier 10 and prevents grass from growing between the curved wall elements 20. The carrier plate 40 may be covered with soil, mulch, or other landscaping materials based upon a user's preference.

Referring to FIG. 3, and as explained in more detail subsequently, the carrier plate 40 also supports removable attachment of the curved wall elements 20 via a plurality of integral first posts 25. Those first posts 25 enable secure mechanical connection to corresponding sockets 28 of the curved wall elements 20 and curved cap elements 22.

The landscape barrier 10 may be introduced with curved wall elements 20 and curved cap elements 22 having different radii, thereby being used with different sized trees 100, various existing structures, or the like. Furthermore, it should be understood that the landscape barrier 10 may be used to form other shapes besides circular as shown in FIG. 1. Preferably curved walls 20 and curved caps 22 may be assembled together to form a structure without the carrier plate 40. This is particularly useful if the landscape barrier 10 is used on a patio or other surface.

Refer now to FIGS. 3 and 4, respectively sectional views of the landscape barrier 10. The landscape barrier 10 provides protection against damage due to wind and other forces. To that end the landscape barrier 10 includes a plurality of ground anchors 120, a network of interconnecting first posts 25, second posts 26 and sockets 28, and a plurality of anchor apertures 43 through the carrier plate 40. The interconnecting first posts 25, second posts 26 and sockets 28 are used to securely connect the curved wall elements 20, curved cap elements 22 and the carrier plate 40 together, while the ground anchors 120 pass through the anchor apertures 43 into the ground 110 to pin the carrier plate to the ground 110. The anchors 120, which are beneficially metal or rigid plastic spikes, or equivalent ground fasteners driven into the ground 110 using an appropriate driving tool.

In practice a bottom tier of curved wall elements 20 is placed upon and secured to the carrier plate 40 by interlocking a plurality of integral first posts 25 of the carrier plate 40 with correspondingly positioned sockets 28 that are spaced along the bottom of the curved wall elements 20. Then, additional tiers of curved wall elements 20 can be attached above lower curved wall elements 20 using a plurality of second posts 26 that are spaced along the top of each curved wall element 20.

Those second posts 26 attach to the sockets 28 on the bottoms of the curved wall elements 20. Tiers of curved wall element 20 can be stacked to obtain a desired landscape barrier 10 height.

Turning now primarily to FIG. 4, in practice each second post 26 is dimensioned to be inserted into a corresponding socket 28 to form a removable "snapping" connection. Those snapping connections are formed by respective male locking features 30 and female locking features 32. The male locking features 30 are protruding annular features located along a top perimeter edge of the first posts 25 and second posts 26. The female locking features 32 are located along the upper perimeter within each socket 32.

It is envisioned that the landscape barrier 10 elements would be introduced in multiple colors and external textures to simulate various materials which complement an existing or a planned landscaping scheme.

FIGS. 5a and 5b provide perspective and partially exploded views of a straight assembly embodiment 200. The straight assembly embodiment 200 enables creating straight barriers which may also incorporate right or left ninety degree)(90° angles to create various barrier designs. The straight assembly embodiment 200 may be used to form opened or closed structures as well as retaining walls having varying lengths, widths, and perimeter shapes.

The straight assembly embodiment 200 uses similar materials and attachments as the previously described landscape barrier 10. However, the straight assembly embodiment 200 includes a plurality of straight wall elements 220, a plurality of straight cap elements 222, a plurality of left corner elements 224a, and a plurality of right corner elements 224b. The straight wall elements 220, straight cap elements 222, left corner elements 224a, and right corner elements 224b used the previously described integral first posts 25, second posts 26 and sockets 28 to secure the straight assembly embodiment 200.

The straight assembly embodiment 200 may further include straight carrier plates 240 to secure the straight assembly embodiment 200 to a ground 110 in a similar manner as the previously described preferred embodiment 10. It is envisioned that the straight carrier plate 240 would include anchor apertures 43 and would be cut to length as needed by a user to provide an aesthetic border around the straight assembly embodiment 200.

It is envisioned that other styles and configurations of the present invention can be easily incorporated into the teachings of the present invention, and only particular configurations are shown and described, that is for purposes of clarity and disclosure and not by way of limitation of scope.

The preferred embodiment of the present invention can be utilized by the common user in a simple and effortless manner with little or no training. After initial purchase or acquisition of the landscape barrier 10 it would be installed as indicated in FIGS. 1-4.

The method of installing and utilizing the landscape barrier 10 may be achieved by: procuring a model of the landscape barrier 10 having a desired radius, number of curved wall elements 20, curved cap elements 22 and a carrier plate 40 as well as a desired color and/or texture; installing the carrier plate 40 at a desired location by placing the carrier plate 40 upon a ground 110; driving anchors 120 through the anchor apertures 43 and into the ground 110; installing a tier of curved wall elements 20 on the carrier plate 40 by aligning and pressing the sockets 28 of each curved wall element 20 onto corresponding first posts 25 of the carrier plate 40 until making a "snapping" connection; installing additional tiers of curved wall elements 20 being successively aligned in an offset manner and pressing the sockets 28 of each curved wall element 20 onto corresponding second posts 26 of the subjacent curved wall elements 20 until obtaining a desired height; installing a tier of curved cap elements 22 by aligning and pressing the sockets 28 of each curved cap element 22 onto corresponding second posts 26 of a subjacent tier of curved wall elements 20 in like manner; and, benefiting from reduced effort required to construct a secure and light-weight landscaping barrier afforded a user of the present invention 10.

The straight assembly embodiment 200 may be assembled in a similar manner as the preferred embodiment 10 using alternate straight wall elements 220, straight cap elements 222, left corner elements 224a, right corner elements 224b, and straight carrier plates 240 to form a desired linear or rectangular barrier having a desired perimeter shape and height. In a similar manner as the preferred embodiment 10, the first posts 25, second posts 26 and sockets 28 are used to provide a stable structure.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A landscape barrier, comprising:
an elongated carrier plate having a plurality of anchor apertures and a plurality of first posts, each first post having a first male locking feature with a protruding annular first male member located and extending along a top perimeter edge of the first post;
a first straight wall member having a first wall bottom with a first wall socket having a first female locking feature located along a first upper perimeter of the first wall socket, said first female locking feature receiving said first male member, said first straight wall member further including a top with a second post having a second male locking feature with a second male member;
a straight cap member having a cap bottom with a cap socket receiving said second male member in a second female locking feature located along a cap upper perimeter of the cap socket;
an anchor passing through one said anchor aperture of said plurality of anchor apertures and into a substrate; and
wherein said first male member snap fits into said first wall socket.

2. The landscape barrier according to claim 1, further including a corner member having a corner top including a corner post, and a corner bottom with a corner socket receiving one of said first male members.

3. The landscape barrier of claim 1, wherein said second post and said cap socket enable said straight cap member and said straight wall element to be horizontally offset when interconnected.

4. The landscape barrier of claim 1, wherein said carrier plate is comprised of a material suitable for burial.

5. The landscape barrier of claim 1, further including a second straight wall element having a second wall bottom with a second wall socket receiving another said first post of said plurality of first posts.

6. The landscape barrier of claim 5, wherein each of said first and second posts are similarly dimensioned.

7. A landscape barrier, comprising:
a curved carrier plate having a plurality of anchor apertures and a plurality of first posts, each first post having a first male locking feature including a protruding annular first male member located and extending along a top perimeter edge of the first post;
a first curved wall element having a first wall bottom with a first wall socket having a first female locking feature located along a first upper perimeter of the first wall socket, said first female locking feature receiving said first male member, said first curved wall element further including a first wall top with a second post having a second male locking feature with a second male member;
a curved cap element having a cap bottom with a cap socket receiving said second male member in a cap female locking feature located along a cap upper perimeter of the cap socket;
an anchor passing through one said anchor aperture of said plurality of anchor apertures and into a substrate; and
wherein said first male member snap fits into said first wall socket.

8. The landscape barrier of claim 7, wherein said carrier plate is an arcuate shaped planar structure.

9. The landscape barrier of claim 7, wherein said second post and said cap socket enable said curved cap element and said curved wall element to be horizontally offset when interconnected.

10. The landscape barrier of claim 7, wherein said carrier plate is comprised of a material suitable for burial.

11. The landscape barrier of claim 7, further including a second curved wall element having a second wall bottom with a second wall socket receiving another said first post of said plurality of first posts.

12. The landscape barrier of claim 11, wherein each of said first and second posts are similarly dimensioned.

\* \* \* \* \*